United States Patent [19]

Osborne

[11] Patent Number: 4,536,822

[45] Date of Patent: Aug. 20, 1985

[54] ELECTRIC CIRCUIT INTERRUPTER AND ASSOCIATED MOUNTING

[75] Inventor: Anthony Osborne, Duluth, Ga.

[73] Assignee: Kearney-National, Inc., Atlanta, Ga.

[21] Appl. No.: 706,911

[22] Filed: Mar. 1, 1985

Related U.S. Application Data

[63] Continuation of Ser. No. 603,623, Apr. 25, 1984, abandoned.

[51] Int. Cl.[3] .......... H02B 1/18

[52] U.S. Cl. .......... 361/340; 361/432; 200/48 P; 200/51 R; 200/244; 337/191

[58] Field of Search .......... 361/335, 340, 341, 417, 361/419, 420, 427, 429, 430, 432; 200/48 P, 48 KB, 48 R, 254, 244, 51 R, 318, 320, 322; 337/191 M, 167-172, 174-181

[56] References Cited

U.S. PATENT DOCUMENTS 2,629,794 2/1953 Hubbard .......... 337/178

3,852,696 12/1974 Cameron .......... 337/178

4,326,184 4/1982 Murdock .......... 337/168

FOREIGN PATENT DOCUMENTS 504622 7/1954 Canada .......... 337/167

*Primary Examiner*—G. P. Tolin

*Attorney, Agent, or Firm*—Rodgers & Rodgers

[57] ABSTRACT

An electric circuit interrupter and associated mounting comprises an elongated support element of insulating material mounted for swinging movement about a fixed pivot and having a pair of movable contacts mounted thereon and engageable with fixedly mounted contacts, a circuit interrupter mounted on said elongated support element and having a pair of terminals respectively connected with the movable contacts, and an electric bus of conducting material connected with one of the movable contacts and having a plurality of points of connection for cooperating with one terminal of the circuit interrupter whereby circuit interrupters of different ratings and physical dimensions may be mounted on said elongated support element.

7 Claims, 7 Drawing Figures

ELECTRIC CIRCUIT INTERRUPTER AND ASSOCIATED MOUNTING

This is a continuation of application Ser. No. 603,623 filed Apr. 25, 1984, now abandoned.

TECHNICAL FIELD

This invention relates to circuit interrupters such as electric fuses mounted within metal enclosures and such as electric cutouts. Such fuses and cutouts are commonly of the expulsion type wherein interruption of an electric current occurs at the peak of an alternating current wave.

BACKGROUND ART

Electric fuses mounted within metal enclosures and electric cutouts are ordinarily of the expulsion type and thus must be constructed so as to withstand conditions which occur when interruption is effected at the peak of the alternating current wave.

Current limiting fuses are constructed so as to interrupt alternating electric current on the ascending portion of the current wave so that interruption occurs at an instantaneous current value substantially less than the peak value of such current wave. For this reason, current limiting fuses are preferable for many circuit interrupting applications because they effectively limit the magnitude of instantaneous current which must be interrupted.

Known previous applications of current limiting fuses for use as replacement devices for expulsion fuses mounted within metal enclosures and for electric cutouts of the expulsion type have been limited to a single dimensional structure and thus are not well suited for easy application for different current capacities and different voltages.

DISCLOSURE OF THE INVENTION

According to this invention in one form, an elongated support element of insulating material is mounted for swinging movement about a fixed pivot and is provided with a pair of spaced apart contacts mounted thereon which respectively engage fixedly mounted contacts, the elongated support element being arranged to accommodate the mounting of a circuit interrupter such as an electric fuse in such manner that one terminal of the circuit interrupter is connected to one movable contact on the elongated support element and an electric bus having a plurality of connection points is mechanically and electrically connected with the other contact mounted on the elongated support element so that the remaining terminal of the electric circuit interrupter may be connected with a point of connection along the electric bus. By this means electric circuit interrupters of different lengths may be used and thus application of circuit interrupters for different voltage requirements is effectively accommodated according to one important feature of this invention. In addition for accommodating currents of different magnitudes, the elongated support element is adapted for mounting a plurality of parallel connected circuit interrupters and by this means to provide for interruption of currents of varying magnitudes.

BEST MODE OF CARRYING OUT THE INVENTION

Figure 1:
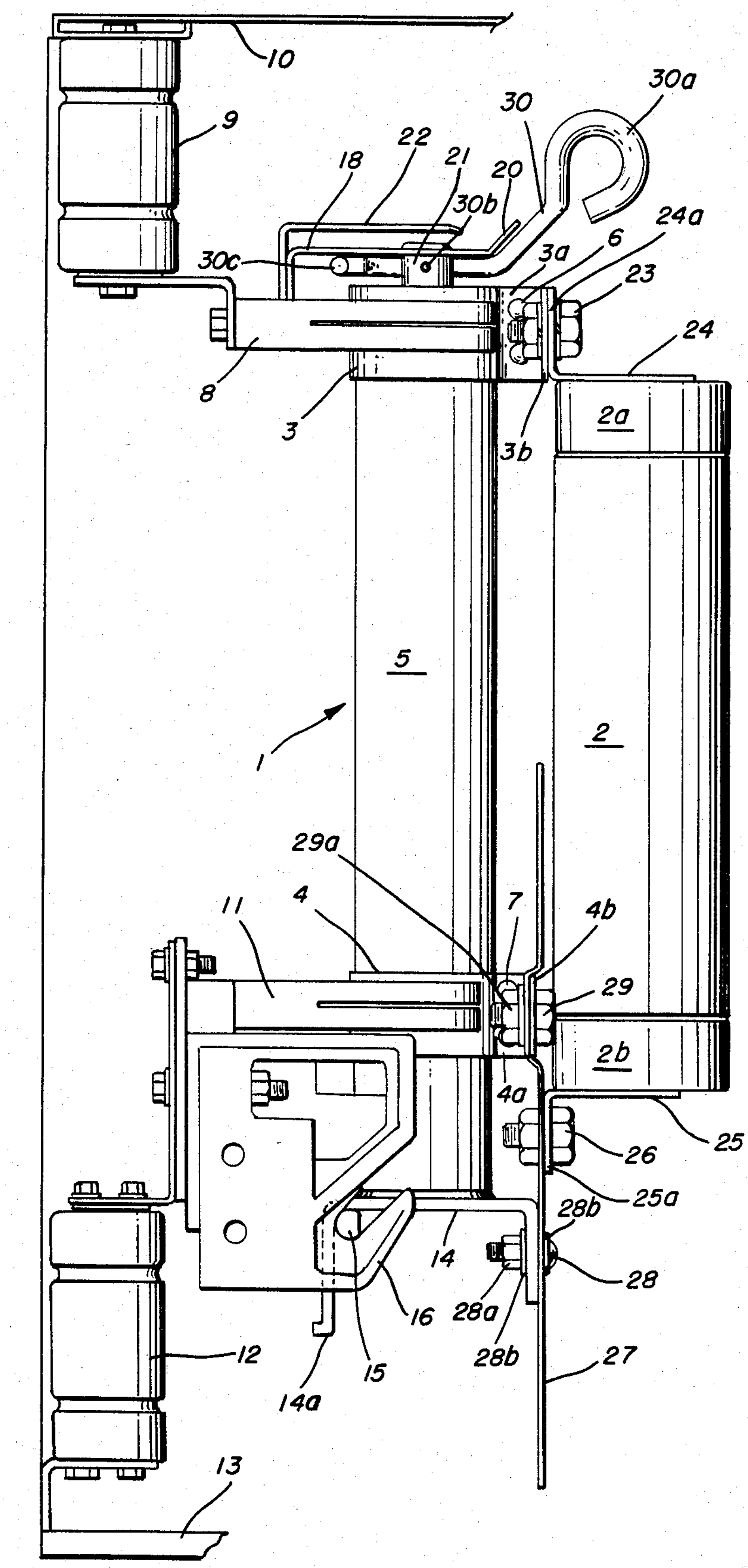
FIG. 1 is a side view of an electric circuit interrupter and associated mounting formed according to this invention and which shows the structure in the closed circuit position.

In the drawings an electric circuit interrupter mounting formed according to this invention is generally designated by the numeral 1 and the circuit interrupter mounted thereon is generally designated by the numeral 2 and is provided with end terminal caps 2*a* and 2*b*. Elongated electric circuit interrupter mounting 1 includes a pair of movable contacts 3 and 4 which envelop opposite ends of elongated support element 5 and whose radial extensions 3*a* and 4*a* are secured together by means of rivets 6 and 7. Movable contact 3 cooperates with a fixed jaw contact 8 mounted in known manner on insulating device 9 which in turn is mounted on fixed structure 10 by known means. Movable contact 4 cooperates with jaw contact 11 fixedly mounted on insulator 12 which is secured to fixed mounting structure 13 by known means. A bracket 14 is secured in any suitable manner to the lower end of elongated support element 5 and includes a transversely disposed trunion structure 15 which rides in a pair of jaws 16. Bracket 14 is provided with an abutment bracket 14*a* which is arranged to engage a fixed stop 17 best shown in FIG. 3 when the elongated support element 5 and associated structure swings in a clockwise direction about trunion 15 from the position shown in FIG. 1 to that shown in FIG. 3. Bracket 14*a* and stop 17 determine the positions of the parts when the device is in the open position.

For the purpose of securing the elongated support element 5 and associated structure in the closed circuit position represented by FIG. 1, a spring latch 18 is provided with an aperture 19 and a bevelled end portion 20 which cooperates with the axially projecting portion 21 of the contact 3 so that axial portion 21 of contact 3 during counterclockwise swinging movement of elongated support element 5 about trunnions 15 causes axial portion 21 first to engage the bevelled portion 20 and then to enter the aperture 19 of spring latch 18 so as to hold the structure in the closed circuit position as shown in FIG. 1. The spring latch 18 is biased downwardly and toward engagement with the elongated support element 5 by means of a spring structure 22 during a closing operation of element 5 and its axial portion 21.

The elongated support element 5 is formed of insulating material and is adapted to carry the interrupter device such as the current limiting fuse designated by the numeral 2. As is apparent in FIG. 1, bolt 23 extends through an aperture not shown which is formed in the vertical prong 24*a* of an L-shaped terminal element 24 and bolt 23 also extends through lateral extension 3*b* of the radial part 3*a* of movable contact 3 to connect terminal 2*a* with movable contact 3 while L-shaped terminal element 25 is arranged so that its vertical portion 25*a* is secured by bolt 26 with bus 27. Bus 27 formed according to one feature of this invention is secured by means of bolt 28 and its associated nut 28*a* and washers 28*b* with bracket 14 and is also secured by bolt 29 and its associated nut 29*a* with a lateral extension 4*b* of the radial part 4*a* of the movable contact 4 mounted on elongated support element 5.

Thus the structure shown in FIG. 1 includes an electric circuit from jaw contact 11 through movable contact 4, bus 27, bracket 25, fuse terminal 2*b*, the electric circuit interrupter 2, terminal 2*a* thereof, bracket 24, movable contact 3 to jaw contact 8. Of course conductors are provided whereby a circuit is interconnected with jaw contacts 4 and 8 and such structures are well known.

For the purpose of releasing the latch 18 from its closed condition as represented in FIG. 1, a latch release device 30 having ring structure 30*a* at one end is pivotally mounted by pin 30*b* to the axially extending portion 21 of support element 5 and its laterally disposed part 30*c* is arranged to swing the latch 18 and its spring bias 22 upwardly and somewhat toward the left at such time as a downward force is applied to the ring 30*a* to cause clockwise motion of latch release 30 about its pivot 30*b*. This action of course swings the latch 18 in such manner as to disengage the axial extension 21 of elongated support element 5 from the aperture 19 in latch 18 and allows the mechanism including the elongated support structure 5, the interrupter 2 and associated structure to swing in a clockwise direction about the trunnions 15 to occupy the position depicted in FIG. 3. Clockwise motion of the structure is limited by the fixed stop 17 due to engagement of movable abutment element 14*a* therewith. By this means the structure is secured in the position represented in FIG. 3.

In order to close the arrangement, it is simply necessary to engage the ring shaped element 30*a* by any suitable means such as a hook stick and to swing the elongated support element 5, the interrupter 2, and associated structure in a counterclockwise direction about the trunnions 15. This action causes the apparatus to move into the position represented in FIG. 1 in which position the structure is held by the latch 18 as is obvious.

Figure 2:
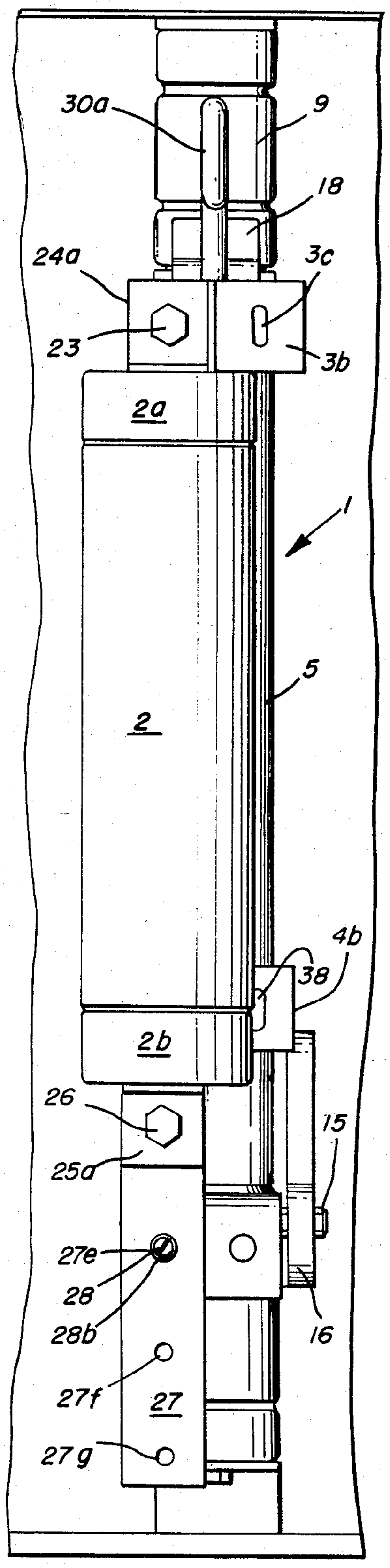
FIG. 2 is an end view of the structure of FIG. 1.
Figure 1A:
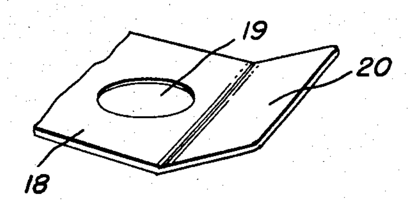
FIG. 1A is a fragmentary perspective view of a latch incorporated in the structure of FIG. 1.
Figure 3A:
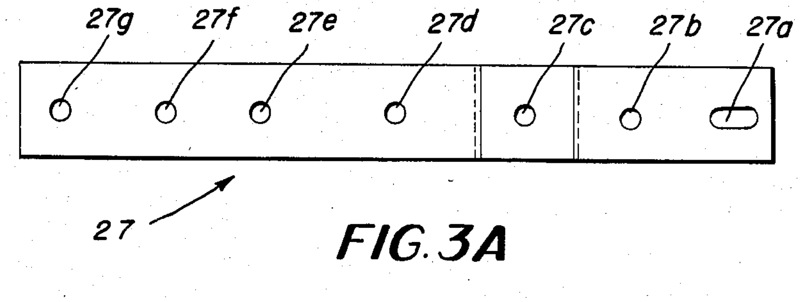
FIG. 3A is a view taken along the line designated 3A—3A in FIG. 3.
Figure 3:
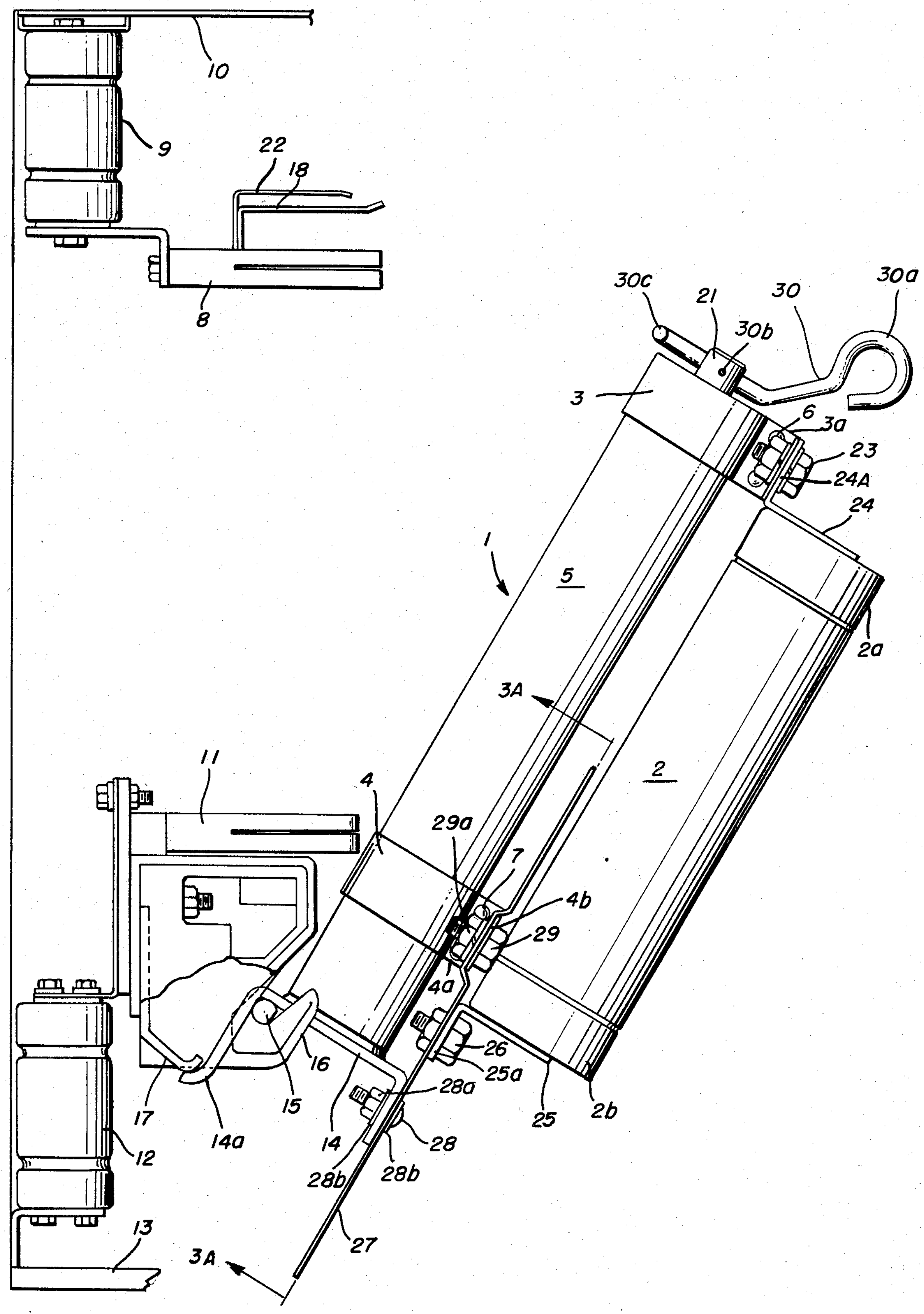
FIG. 3 is a view similar to FIG. 1 but which shows the structure in the open circuit position.

In order to provide for accommodating circuit interrupters such as that indicated by the numeral 2 for a variety of voltage applications, specially constructed bus designated by the numeral 27 is provided according to this invention. As is apparent in FIGS. 1 and 3 bus 27 is mounted to the contact 4 of elongated support structure 5 by means of the bolt 29 and its associated nut 29*a* and to the bracket 14 by means of the bolt 28 and its associated nut 28*a*. Bolt 29 is associated with aperture 27*c* which aperture is best shown in FIG. 3A while bolt 26 is asssociated with aperture 27*d* and bolt 28 is associated with aperture 27*e*. While a fuse of the length depicted in FIGS. 1, 2, and 3 is arranged with its L-shaped bracket 25 connected to the bus 27 at aperture 27*d*, a fuse of a higher voltage rating may be arranged for connection by means of a bracket such as that indicated at 25 through connection point 27*e* of bus 27. The terminal 25 of a fuse of higher voltage could be associated with the aperture 27*f* and an even higher voltage fuse could have its bracket 25 associated with the aperture 27*g*.

In similar fashion a fuse of shorter length according to a feature of this invention could be employed and its connecting element 25 could be associated with bolt 29 and aperture 27*c* while an even shorter fuse of a lower voltage rating could be arranged with its bracket 25 associated with an aperture 27*b* and an even shorter fuse of a lower voltage rating could be arranged with its bracket 25 associated with aperture 27*a* which could be of an elongated configuration as shown if desired.

For most applications of this invention it is desirable in order to accommodate given space requirements to mount the interrupter such as 2 off center laterally as represented in FIG. 2. Toward this end the pair of mounting plates 3*b* which are extensions of radial parts 3*a* of contact 3 are provided with elongated apertures 3*c*. The interrupter such as 2 may be mounted toward the left as represented in FIG. 2 or shifted along with bus 27 toward the right if desired as is obvious.

Figure 4:
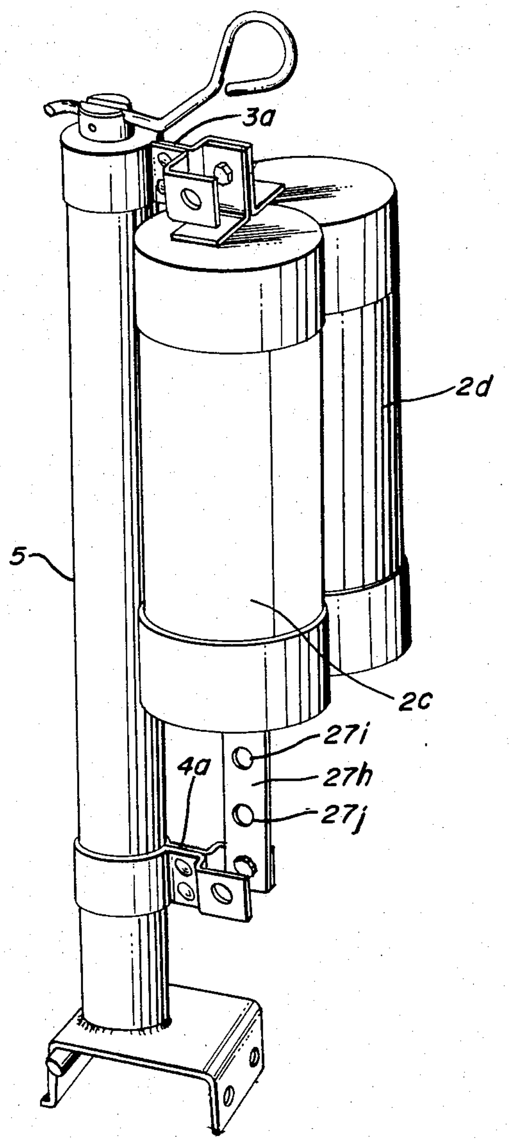
FIG. 4 is a perspective view of a circuit interrupter and associated mounting in which a pair of electric fuses are mounted on a single elongated support element.
Figure 4A:
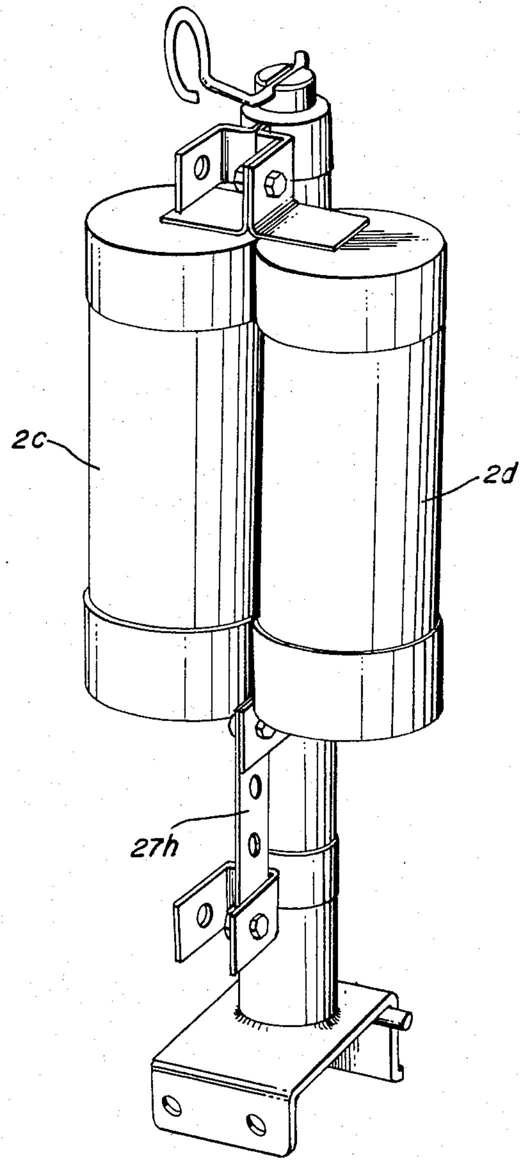
FIG. 4A is a view similar to FIG. 4 but which shows the structure from a different vantage point from that depicted in FIG. 4.

For the purpose of accommodating conditions of varying current magnitudes, the structures shown in FIGS. 4 and 4A may be employed in accordance with one aspect of this invention.

The arrangement shown in FIG. 4 accommodates side by side mounting of interrupter units 2*c* and 2*d*, the interrupters 2*c* and 2*d* being adapted for handling currents of greater magnitude than would a single interrupter such as 2*c* and 2*d*. The bus 27*h* is adapted to accommodate the shorter interrupters 2*c* and 2*d* which are of lower voltage ratings than interrupters of greater length and includes apertures such as 27*a* and 27*j*. If desired fuses such as 2*c* and 2*d* may be mounted with one fuse such as 2*c* interposed between elongated element 5 and the other fuse 2*d* or vice versa. In this instance radial elements such as 3*a* and 4*a* could be made somewhat longer.

INDUSTRIAL APPLICABILITY

By this invention an improved electric circuit interrupter and mounting therefor are provided which readily adapt that apparatus for use in conjunction with conditions requiring varying physical dimensions and voltage ratings and which also accommodate conditions wherein the current magnitude is variable. In all instances the advantages of current limiting fuses are made possible.

I claim:

1. An electric circuit interrupter and associated mounting comprising an elongated support element of insulating material pivotally mounted about a fixed pivot, a pair of movable contacts mounted on said elongated support element in spaced relation to each other and arranged to engage and to disengage a pair of fixedly mounted contacts respectively, a circuit interrupter mounted on and movable with said elongated support element and having a pair of spaced apart terminals one of which is directly connected with one of said movable contacts and wherein the improvement includes an elongated specially constructed bus of conducting material disposed in generally parallel relation to said elongated support element and electrically connected with the other of said movable contacts and having a plurality of points of connection each including an aperture, said points of connection being spaced along the length of the bus for selectively cooperating with the other terminal of said circuit interrupter whereby circuit interrupters of different electrical ratings and physical dimensions may be mounted on said elongated support element.

2. A circuit interrupter and mounting according to claim 2 wherein the disposition of said bus is laterally adjustable.

3. A circuit interrupter and mounting according to claim 1 wherein one end of said elongated support element is adjacent said fixed pivot and wherein an abutment bracket is mounted on said elongated support element adjacent said one end thereof and engageable with a fixed stop mounted in spaced relation to said fixed pivot to maintain said fixed and said movable contacts in open circuit predetermined spaced relation.

4. A circuit interrupter and mounting according to claim 3 wherein said bus is secured to a part of said abutment bracket.

5. A circuit interrupter and mounting according to claim 1 wherein a latch is arranged to engage the swing end of said elongated support element so as to hold said movable contacts in closed position and a latch release element is pivotally mounted on said elongated support element near the swing end thereof and engageable with said latch to impart releasing movement thereto.

6. An electric circuit interrupter and mounting according to claim 1 wherein said circuit interrupter comprises a plurality of electric fuses connected in parallel relation to each other.

7. A circuit interrupter and mounting according to claim 1 wherein the spacing of said points of connection is such as to accommodate standard terminal spacing of a plurality of circuit interrupters.

* * * * *